(12) United States Patent
Trim et al.

(10) Patent No.: US 11,698,978 B2
(45) Date of Patent: Jul. 11, 2023

(54) MASKING PRIVATE CONTENT ON A DEVICE DISPLAY BASED ON CONTEXTUAL DATA

(71) Applicant: INTERNATIONAL BUSINESS MACHINES CORPORATION, Armonk, NY (US)

(72) Inventors: Craig M. Trim, Ventura, CA (US); Sarbajit K. Rakshit, Kolkata (IN); Victor Povar, Vancouver (CA); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 814 days.

(21) Appl. No.: 16/211,703

(22) Filed: Dec. 6, 2018

(65) Prior Publication Data

US 2020/0184080 A1   Jun. 11, 2020

(51) Int. Cl.
| | |
|---|---|
| *G06F 21/00* | (2013.01) |
| *G06F 21/60* | (2013.01) |
| *G06Q 30/0251* | (2023.01) |
| *G09G 5/377* | (2006.01) |
| *G06F 40/40* | (2020.01) |

(52) U.S. Cl.
CPC .............. *G06F 21/60* (2013.01); *G06F 40/40* (2020.01); *G06Q 30/0261* (2013.01); *G09G 5/377* (2013.01); *G09G 2354/00* (2013.01); *G09G 2358/00* (2013.01)

(58) Field of Classification Search
CPC . H04L 51/046; H04L 63/0428; H04L 67/306; H04L 69/14; H04L 9/3247; H04L 2209/60; H04L 51/00; H04L 63/061; G06F 21/60; G06F 40/40; G06Q 30/0261; G09G 5/377; G09G 2354/00; G09G 2358/00

See application file for complete search history.

(56) References Cited

U.S. PATENT DOCUMENTS

| | | | |
|---|---|---|---|
| 9,251,714 B2 | 2/2016 | Yoon | |
| 9,953,191 B2 | 4/2018 | Hamlin et al. | |
| 2009/0080661 A1* | 3/2009 | Brown | H04W 12/04031 380/279 |
| 2010/0033753 A1 | 2/2010 | Stephenson | |
| 2010/0064230 A1* | 3/2010 | Klawitter | G06F 9/452 715/748 |
| 2013/0167249 A1* | 6/2013 | Birtwhistle | G06Q 10/10 726/28 |

(Continued)

*Primary Examiner* — Ghazal B Shehni
(74) *Attorney, Agent, or Firm* — Randy E. Tejeda; Andrew D. Wright; Calderon Safran & Cole P.C.

(57) ABSTRACT

A computer-implemented method includes: identifying, by a computing device, private portions and non-private portions of content displayed on a user device; generating, by the computing device, instructions to modify the display of the content on the user device to mask the private portions of the content, group the private portions of the content together, and group and the non-private portions of the content together; and outputting, by the computing device, the instructions to cause the user device to modify the display of the content on the user device such that the masked private portions of the content are grouped together and the non-private portions of the content are grouped together, wherein the non-private portions are exposed and visible.

19 Claims, 8 Drawing Sheets

(56) References Cited

U.S. PATENT DOCUMENTS

| | | | |
|---|---|---|---|
| 2014/0176394 A1* | 6/2014 | Horiuchi | G06F 3/1415 |
| | | | 345/1.3 |
| 2015/0007351 A1 | 1/2015 | Janajri et al. | |
| 2015/0286333 A1 | 10/2015 | Shey | |
| 2016/0226836 A1* | 8/2016 | Garcia | H04L 63/061 |
| 2016/0269376 A1* | 9/2016 | Goyal | G02B 27/017 |
| 2016/0286028 A1 | 9/2016 | Ahuja et al. | |
| 2017/0094019 A1 | 3/2017 | Ahmed et al. | |
| 2017/0149710 A1 | 5/2017 | Golbandi et al. | |
| 2018/0004973 A1* | 1/2018 | Roimela | G06F 21/32 |

* cited by examiner

MASKING PRIVATE CONTENT ON A DEVICE DISPLAY BASED ON CONTEXTUAL DATA

BACKGROUND

The present invention generally relates to masking private content on a user device display and, more particularly, to masking private content on a user device display based on contextual data used to automatically identify private content.

User devices (e.g., smart phones, tablet devices, laptops, etc.) host messaging applications to send and receive messages (e.g., e-mail messages, text messages, instant messages, etc.). User devices also host document viewing applications to view any variety of documents.

SUMMARY

In an aspect of the invention, a computer-implemented method comprises: identifying, by a computing device, private portions and non-private portions of content displayed on a user device; generating, by the computing device, instructions to modify the display of the content on the user device to mask the private portions of the content, group the private portions of the content together, and group and the non-private portions of the content together; and outputting, by the computing device, the instructions to cause the user device to modify the display of the content on the user device such that the masked private portions of the content are grouped together and the non-private portions of the content are grouped together, wherein the non-private portions are exposed and visible.

In an aspect of the invention, there is a computer program product comprising a computer readable storage medium having program instructions embodied therewith. The program instructions are executable by a user device to cause the user device to: identify private portions and non-private portions of content displayed on the user device; generate instructions to modify the display of the content on the user device to mask the private portions of the content, group the private portions of the content together, and group and the non-private portions of the content together; and execute the instructions to cause the user device to modify the display of the content on the user device such that the masked private portions of the content are grouped together and the non-private portions of the content are grouped together, wherein the non-private portions are exposed and visible.

In an aspect of the invention, there is a system include: a processor, a computer readable memory and a computer readable storage medium associated with a computing device; program instructions to automatically identify private text messages and non-private text messages, of a plurality of text messages, displayed on a user device, wherein the automatically identifying the private text messages and non-private text messages is based on a contextual analysis of contextual information associated with the plurality of text messages; program instructions to present via the user device suggestions to mask the identified private text messages; program instructions to receive user input identifying a first subset of the plurality of text messages to mask and a second subset of the plurality of text messages to remain unmasked; program instructions to generate instructions to modify the display of the plurality of text messages on the user device to mask the first subset of the plurality of text messages, group the masked first subset of the plurality of text messages together, and group and the unmasked second subset of the plurality of text messages together; and output the instructions to cause the user device to modify the display of the content on the user device such that the masked first subset of the plurality of text messages are grouped together and the unmasked second subset of the plurality of text messages are grouped together. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
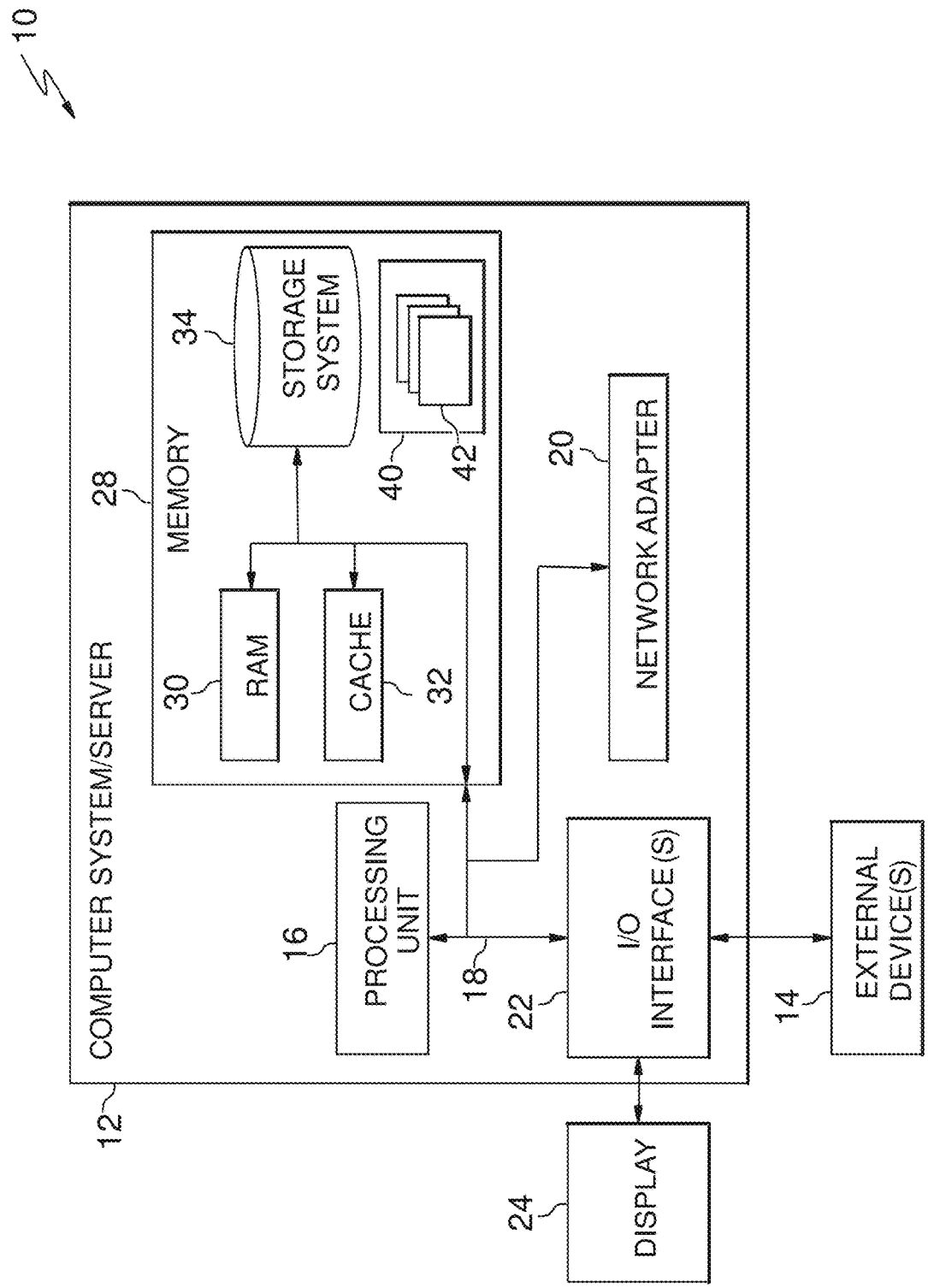
FIG. 1 shows an illustrative environment for managing the processes in accordance with aspects of the invention.

The present invention generally relates to masking private content on a user device display and, more particularly, to masking private content on a user device display based on contextual data used to automatically identify private content. In accordance with aspects of the present invention, a user device masks private content currently displayed on the user device so that non-private content displayed on the user device can be shared (e.g., with an individual other than the owner of the user device).

In embodiments, aspects of the present invention implement cognitive computing techniques to automatically identify private content currently displayed on a user device. As an illustrative, non-limiting example, aspects of the present invention, in response to a user instruction to share the display of the user device, automatically identify and mask private messages in a messaging application, while keeping the non-private messages exposed to be viewed (e.g., by an individual other than the owner of the user device or the recipient of the messages). In this way, the user can share their display to another individual (e.g., by physically showing the user device to the other individual, by taking and sending a screenshot of the display with the private messages masked, through a screen sharing system, or the like). Similarly, in embodiments, aspects of the present invention implement cognitive computing to analyze contextual data to determine a boundary containing private content (e.g., an account number in a financial document, etc.) and mask the private content responsive to user instruction to share the user device display.

As described herein, aspects of the present invention determine which portion of content currently displayed on the user device is considered "private" and "non-private" based on cognitive processes and analysis of contextual data. For example, aspects of the present invention determine portions of content that are considered private based on historical determinations of private versus non-private content and/or natural language classification rules/criteria identifying text that is considered private. Additionally, or alternatively, aspects of the present invention identify private content based on information regarding an individual with whom the content is to be shared. That is, certain content may be considered private when shared with one individual whereas the same content may be considered non-private when shared with a different individual. As an example, in the case where the user device is to be physically shown to the individual with whom the content is to be shared, aspects of the present invention identify the individual with whom the content is be shared by facial/voice recognition, determine the private content based on the individual's identity, and mask the private content accordingly. In the case where the display is to be shared via screenshots, aspects of the present invention query for a recipient of the screenshot prior to its generation, and generate a custom screenshot having private the portions masked in which the private portions are based on the recipient's identity. In embodiments, aspects of the present invention generate and maintain user profiles identifying different privacy rules and levels for identifying private content for different users.

In addition to the automatic determination of private content and boundaries within a display containing private content, aspects of the present invention allow a user to manually confirm or modify (e.g., via a user interface) the content that is automatically determined to be private. Additionally, or alternatively, aspects of the present invention allow a user to select content to mask. In embodiments, the manual confirmation, modification, and selections are used to update machine learning algorithms used in the future automatic identification of private content to mask. Further, contextual data regarding the determination of private content is stored for future automatic identification of private content. For example, when a user selects private content to mask, and physically shows the display of the user device to another individual, aspects of the present invention implement facial recognition on the other individual and store a profile indicating the criteria for identifying private content when shared with the individual matching the individual's facial recognition profile. In this way, contextual data surrounding the identification of private content is stored, maintained, and used to continuously evolve and improve machine learning and cognitive processes used to automatically identify, suggest, and mask, private content.

As described herein, aspects of the present invention provide a technical solution to the problem of sharing content displayed on a user device, a portion of which contains private content. Further, aspects of the present invention improve the functioning of user devices by implementing functions in the user devices that were not previously possible. Additionally, aspects of the present invention perform unconventional steps, including generating new information that does not already exist (e.g., user profiles indicating privacy rules and privacy levels), and subsequently, using the newly generated information in additional processes for identifying private content.

It should be understood that, to the extent implementations of the invention collect, store, or employ personal information provided by, or obtained from, individuals (for example, private content and private messages), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computing node and is not intended to suggest any limitation as to the scope of use or functionality of embodiments of the invention described herein. Regardless, computer infrastructure 10 is capable of being implemented and/or performing any of the functionality set forth hereinabove In computer infrastructure 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer infrastructure 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2A:
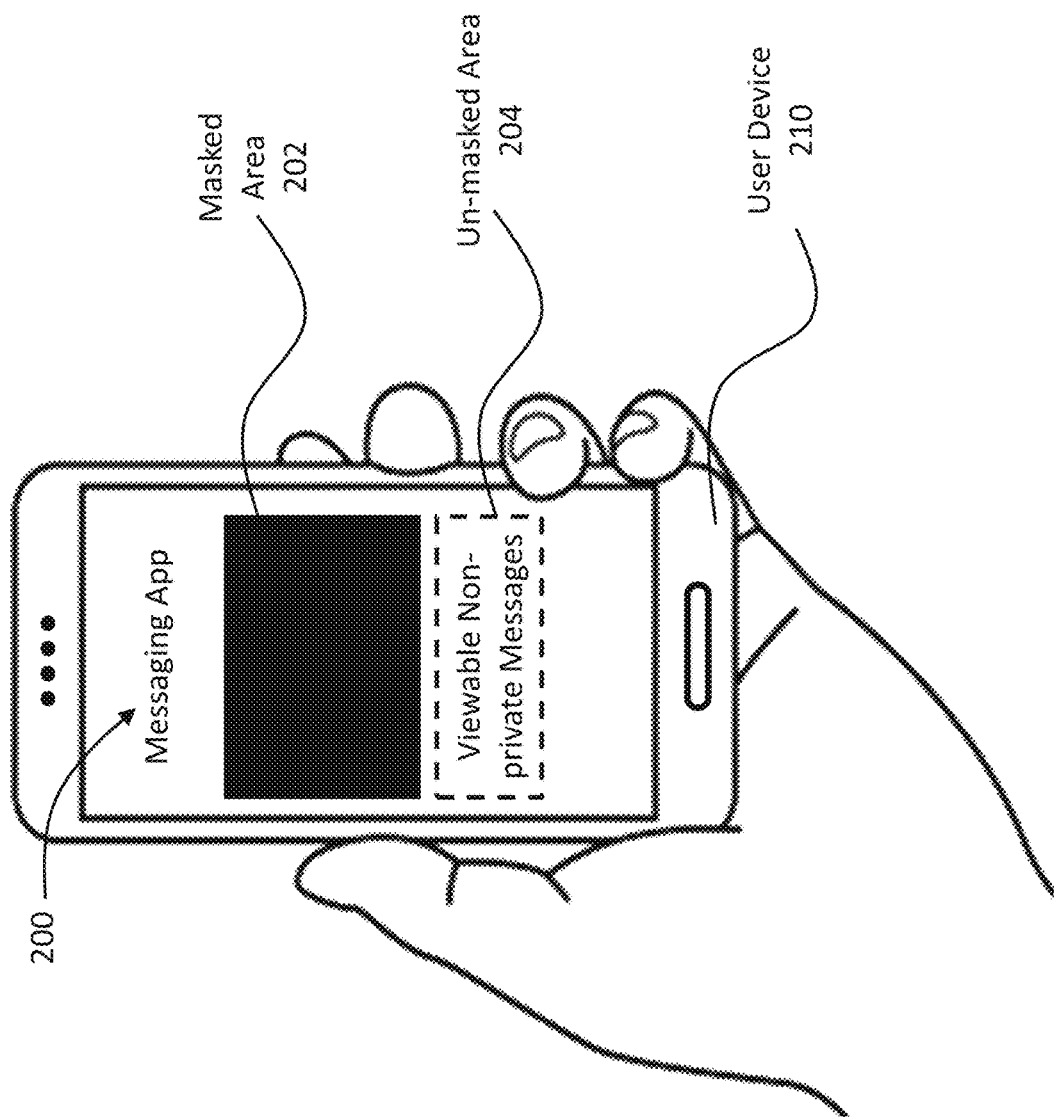
FIGS. 2A-2D show overviews example implementations in accordance with aspects of the present invention.

FIGS. 2A-2D show overviews of example implementations in accordance with aspects of the present invention. As shown in FIG. 2A, a user device 210 includes a user interface 200 that presents a messaging application. In accordance with aspects of the present invention, the user interface 200 includes a masked area 202 and an un-masked area 204. The masked area 202 includes layers having private content (e.g., private messages) and the viewable area includes layers having non-private content (e.g., non-private messages). In this way, when the user shares the user device 210 (e.g., to another individual that is not the owner of the user device 210), the private content is masked and not visible. In embodiments, the private content is unmasked when the owner of the user device 210 unlocks the private content (e.g., via authentication techniques such as password/passcode, facial recognition, voice recognition, biometrics authentication, etc.). In embodiments, the content shown in user interface 200 (e.g., with the masked private content) is saved as a screenshot and the screenshot is shared to other users.

Figure 2B:
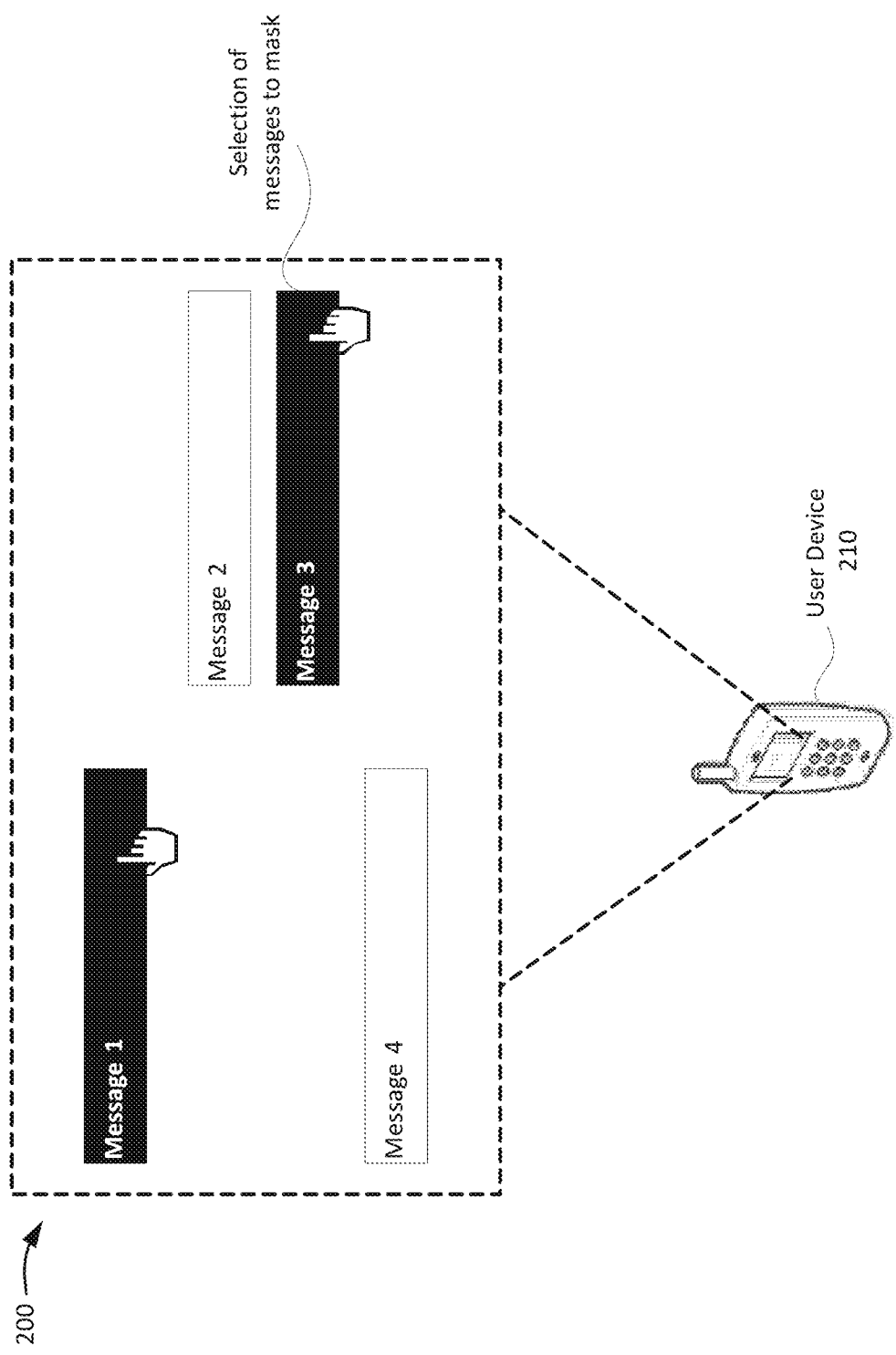
Figure 2C:
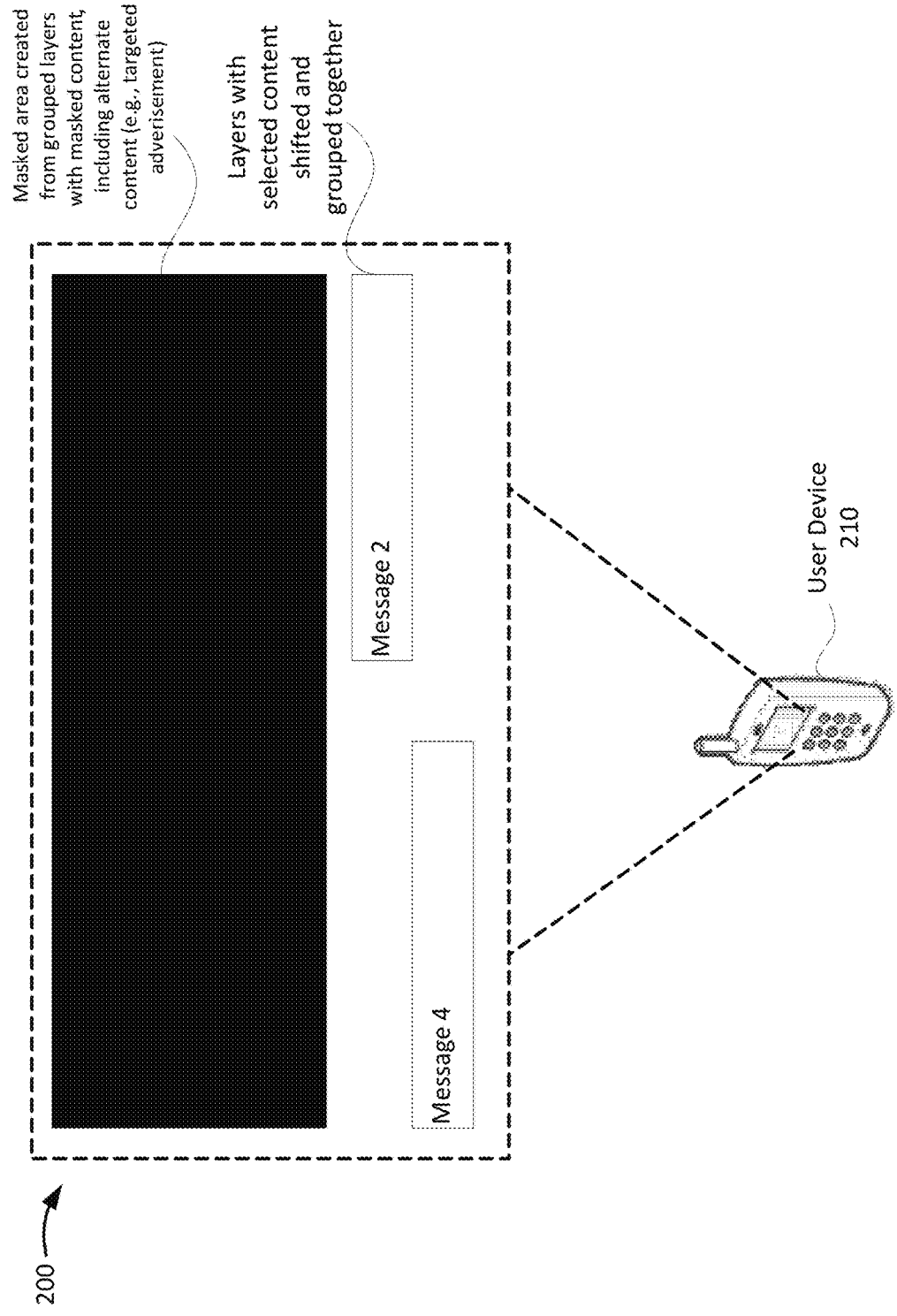
Figure 2D:
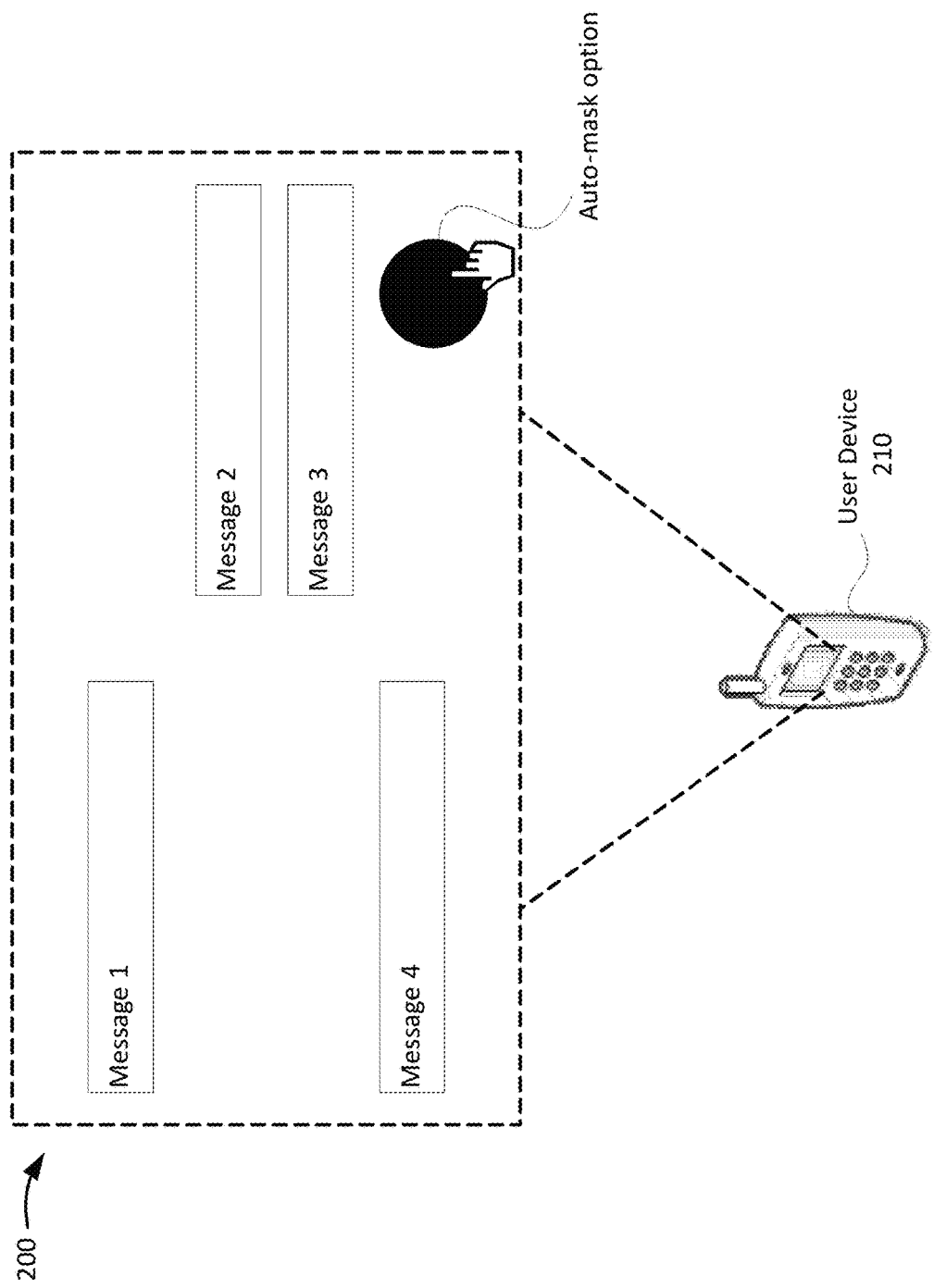

Referring to FIG. 2B, in embodiments, the user manually selects (e.g., via the user interface 200) specific content to mask (e.g., specific messages). Additionally, or alternatively, the user uses a stylus or touch-based input to draw a boundary around content to mask. Based on receiving selections of content to mask, the user device 210 generates layers corresponding to the portions of the display to mask, and portions of the display to remain unmasked. In embodiments, the user device 210 manipulates the layers such that the unmasked layers are grouped adjacent to each other, and the masked layers are grouped adjacent to each other. For example, referring to FIG. 2C, a masked area is created by manipulating and grouping the masked layers together. Further, the unmasked layers are manipulated (e.g., shifted) and grouped together such that no breaks exist between the non-private or unmasked messages. In embodiments, alternate content is presented in the masked area. As an illustrative example, a targeted advertisement is displayed in the masked area in which the targeted advertisement is selected based on the identification of the individual with whom the user device 210 is shared to view the non-private content.

In embodiments, the identification of the private content is determined automatically as opposed to through manual selection of private content. For example, referring to FIG. 2D, the user device 210 presents (within the user interface 200), a button or option to auto-mask private content (e.g., private messages). In embodiments, the aspects of the present invention automatically identify which messages are considered private based on a contextual analysis and cognitive computing (e.g., the application of natural language classifiers with rules used to identify private messages, information from a user profile indicating levels of privacy when the content is to be shared with specific users in-person or via sending of screenshots, etc.). As an illustrative example, the user device 210 presents an option to auto-mask private messages, and presents a query to the user asking the user for the identification of whom the individual wishes to share the content (e.g., by selecting the individual from a contacts list, social media profile, etc.). Accordingly, aspects of the present invention identify which of the messages is considered private based on a user profile of the identified user.

Figure 3:
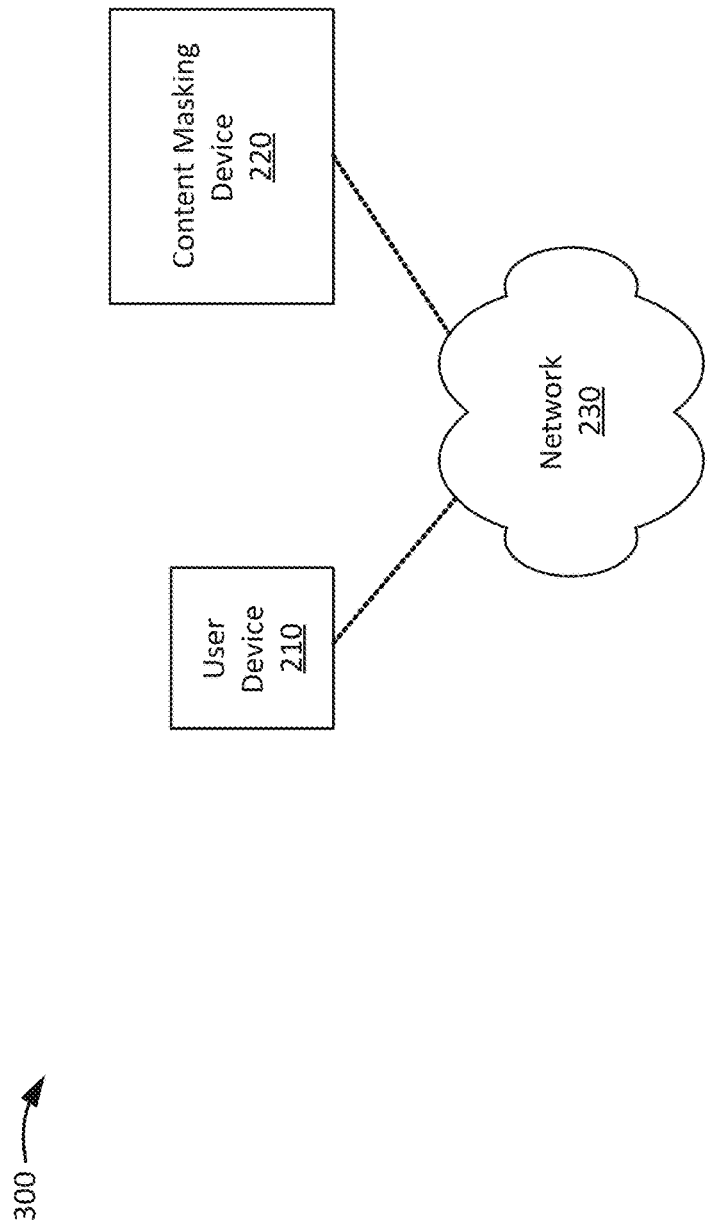
FIG. 3 shows an example environment in accordance with aspects of the present invention.

FIG. 3 shows an example environment in accordance with aspects of the present invention. As shown in FIG. 3, environment 300 includes a user device 210, a content masking device 220, and a network 230. In embodiments, one or more components in environment 300 may correspond to one or more components in the cloud computing environment of FIG. 2. In embodiments, one or more components in environment 300 may include the components of computer system/server 12 of FIG. 1.

The user device 210 includes a computing device capable of communicating via a network, such as the network 230. In example embodiments, the user device 210 corresponds to a mobile communication device (e.g., a smart phone or a personal digital assistant (PDA)), a portable computer device (e.g., a laptop or a tablet computer), a desktop computer, and/or another type of computing device. In some embodiments, the user device 210 hosts an application for sending/receiving messages (e.g., e-mails, texts messages, instant messages, etc.) Additionally, or alternatively, the user device 210 hosts an application for presenting any type of content, such as messages, documents, images, video, audio, etc. As described herein, the user device 210 masks private portions of content so that non-private portions are visible when the content is shared and viewable by other individuals for which viewing of private content is not desirable (e.g., when the content is shared and viewable by other individuals in-person, via screenshots, screen sharing, etc.).

The content masking device 220 includes one or more computing devices (e.g., such as computer system/server 12 of FIG. 1) that performs a privacy masking service for user device 210 (e.g., as a cloud service). In alternative embodiments, the content masking device 220 includes a component or program module (e.g., program module 42 of FIG.

1) implemented within the user device 210. In embodiments, the content masking device 220 identifies private content (or private portions of content displayed on user device 210). For example, as described herein, the content masking device 220 identifies the private content based on user selections received via a user interface of the user device 210, cognitive analysis of contextual data relating to the identification of with whom the content is shared, natural language classification of the content, keyword analysis, time of day, location, etc. Further, the content masking device 220 presents recommendations or suggestions identifying content to be considered private, and receives user feedback via the user device 210 confirming or modifying the suggestions of what is considered private content. The content masking device 220 maintains information correlating the contextual data and user confirmations with tags indicating private content. In this way, machine learning processes continuously refine the automatic identification/tagging of private content based on maintaining a repository of information that correlates the contextual data with the private content.

In embodiments, the network 230 includes one or more wired and/or wireless networks. For example, the network 230 may include a cellular network (e.g., a second generation (2G) network, a third generation (3G) network, a fourth generation (4G) network, a fifth generation (3G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300. Specifically, in embodiments, the operations of the content masking device 220 are integrated within the user device 210. In alternative embodiments, the operations of the content masking device 220 are integrated by a cloud server as part of a cloud service. Devices of the environment 300 may interconnect via wired connections, wireless connections, or a combination of wired and wireless connections.

Figure 4:
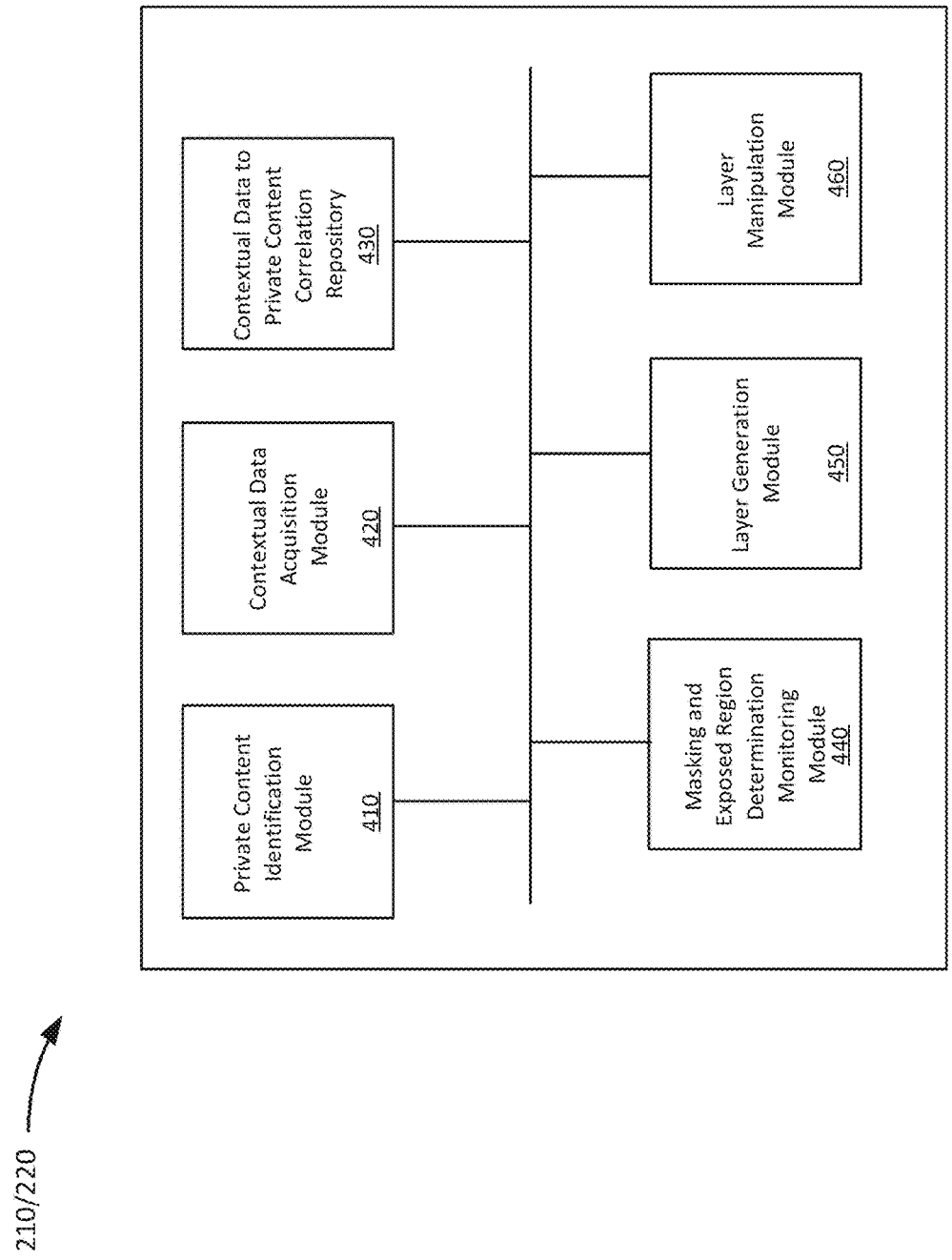
FIG. 4 shows a block diagram of example components of a user device and/or of a content masking application device in accordance with aspects of the present invention.

FIG. 4 shows a block diagram of example components of a user device and/or of a content masking application device in accordance with aspects of the present invention. As shown in FIG. 4, the user device 210 and/or the content masking device 220 includes a private content identification module 410, a contextual data acquisition module 420, a contextual data to private content correlation repository 430, a masking and exposed region determination monitoring module 440, a layer generation module 450, and a layer manipulation module 460. In embodiments, the user device 210 and/or the content masking device 220 may include additional or fewer components than those shown in FIG. 4.

In embodiments, separate components may be integrated into a single computing component or module. Additionally, or alternatively, a single component may be implemented as multiple computing components or modules.

In embodiments, the private content identification module 410 includes a program module (e.g., program module 42 of FIG. 1) that identifies private content (or private portions of a content displayed on a user device 210). In embodiments, the private content identification module 410 identifies the private content via manual user input via a user interface of the user device 210. Additionally, or alternatively, the private content identification module 410 automatically identifies the private content (e.g., without user selection) by implementing cognitive computing techniques to perform a contextual analysis of the context surrounding the sharing of content. More specifically, the private content identification module 410 analyzes contextual data (e.g., the identification of an individual with whom the content is shared, time, location, etc.) and identifies the private content based on an analysis of the displayed content (e.g., natural language classification, image classification, etc.) and the surrounding contextual data. Further, in embodiments, the private content identification module 410 accesses correlation rules from the contextual data to private content correlation repository 430 to identify private content based on the contextual data. In embodiments, the private content identification module 410 implements privacy filters, rules, and criteria that are used to identify private content.

As an illustrative example, the private content identification module 410 automatically determines that account numbers shown in text messages or documents is considered private when the content is to be shared with a particular individual, but should not considered private when the content is to be shared with a different individual. As another example, the private content identification module 410 automatically determines that texts about a certain topic are to be considered private when shared with a particular individual, or with individuals who are within a certain degree of another individual within a social media network. As another example, the private content identification module 410 applies one level or set of privacy filters/rules when content is to be shared with a particular individual, but a different level or set of privacy filters/rules when the content is to be shared with a different individual. In embodiments, the private content identification module 410 presents automatically identified private content to a user to receive user confirmation or modification of the automatically identified private content.

In embodiments, the private content identification module 410 identifies private content in real-time (e.g., based on facial recognition techniques identifying an individual viewing the user device). As an illustrative example, the private content identification module 410 identifies that an individual viewing the user device 210 is not the owner and identifies that a portion of the displayed content is considered private (e.g., for the owner's eyes only). In embodiments, the private content identification module 410 determines an intent of the user when sharing content (e.g., a text message) based on audio received from the user of the user device 210 and the individual with whom to share the text message. In embodiments, the intent of the user is used to determine which text messages are to remain private and which text messages are to be exposed for sharing.

In embodiments, the contextual data acquisition module 420 includes a program module (e.g., program module 42 of FIG. 1) that obtains contextual data with respect to the identification of private content. For example, when private content is identified by the private content identification module 410 (e.g., either by manual user input, or modification of automatically identified content) the contextual data acquisition module 420 obtains the contextual data relating to the identified private content. For example, the contextual data acquisition module 420 obtains the identification of an individual with whom the content is shared, time, location, natural language classification data of the private content, image classification of the content, etc.

In embodiments, the contextual data to private content correlation repository 430 includes a data storage device (e.g., storage system 34) that stores information correlating the private content (e.g., as identified by the private content identification module 410) with the contextual data obtained by the contextual data acquisition module 420. As described herein, information stored by the contextual data to private content correlation repository 430 is used to automatically identify private content (e.g., by the private content identification module 410) based on contextual data (e.g., obtained by the contextual data to private content correlation repository 430). In embodiments, the contextual data to private content correlation repository 430 stores user profiles identifying a privacy level or privacy preferences for different individuals with whom content is to be shared. In embodiments, information stored by the contextual data to private content correlation repository 430 is used for the future automatic identification of private content. That is, the contextual data to private content correlation repository 430 stores data to be used as inputs in a machine learning system that continuously adapts to improve the accuracy of the automatic identification of private content.

In embodiments, the masking and exposed region determination monitoring module 440 includes a program module (e.g., program module 42 of FIG. 1) that determines masking regions on the display of the user device 210 that contain private content (e.g., as identified by the private content identification module 410). In embodiments, the masking and exposed region determination monitoring module 440 identifies virtual coordinates corresponding to the regions of the display of the user device 210 that display the private content. In embodiments, the masking and exposed region determination monitoring module 440 identifies that the remaining regions are regions to remain exposed.

In embodiments, the layer generation module 450 includes a program module (e.g., program module 42 of FIG. 1) that generates layers corresponding to the masking region and exposed regions determined by the masking and exposed region determination monitoring module 440. For example, in embodiments, the layer generation module 450 stores one set of virtual coordinates associated with the masking region, and another set of virtual coordinates associated with the exposed region. The layer generation module 450 forms respective layers (e.g., masking layers and exposed layers) from the corresponding sets of virtual coordinates.

In embodiments, the layer manipulation module 460 includes a program module (e.g., program module 42 of FIG. 1) that manipulates the masking layers and the exposed layers (e.g., as generated by the layer generation module 450). In particular the layer manipulation module 460 shifts/manipulates the layers such that the masking layers are grouped adjacent to each other and the exposed layers are grouped adjacent to each other. In this way, the non-private content is viewed in a more continuous manner without breaks. Further, the masking layers, once shifted, form a continuous region via which alternate content (e.g., targeted advertisements) can be presented.

In embodiments, when the layer manipulation module 460 is implemented within the content masking device 220 and when the content masking device 220 provides privacy masking services to the user device 210, the layer manipulation module 460 outputs instructions to the user device 210 that cause the user device 210 to mask the private portions of content consistent with the manipulation and arrangement of the layers as described herein. In embodiments, when the layer manipulation module 460 is implemented within the user device 210, the layer manipulation module 460 displays the private content in a manner consistent with the manipulation and arrangement of the layers as described herein. In either case, the user device 210 displays a masked area (e.g., similar to the masked area 202 as shown in FIG. 2A) and an un-masked area (e.g., similar to the un-masked area 204 shown in FIG. 2A). As described herein, the displayed content can be shared in-person, or screenshotted and shared remotely.

Figure 5:
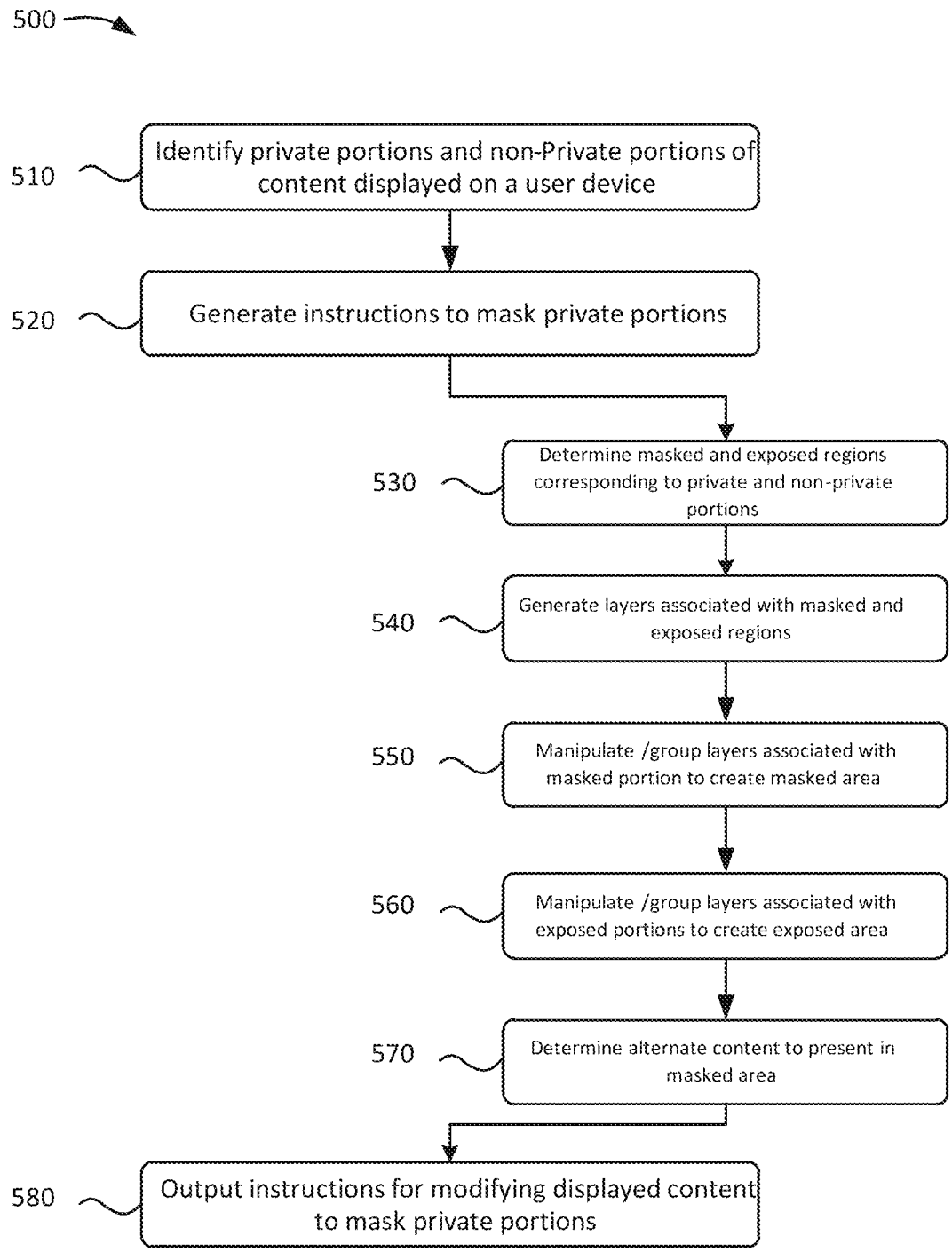
FIG. 5 shows an example flowchart of a process for masking private portions of content displayed on a user device in accordance with aspects of the present invention.

FIG. 5 shows an example flowchart of a process for masking private portions of content displayed on a user device. The steps of FIG. 5 may be implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

As shown in FIG. 5, process 500 includes identifying private portions and non-private portions of content displayed on a user device (step 510). For example, as described above with respect to the private content identification module 410, the content masking device 220 identifies the private portions of content via manual user input via a user interface of the user device 210. Additionally, or alternatively, the content masking device 220 automatically identifies the private content (e.g., without user selection) by implementing cognitive computing techniques to perform a contextual analysis of the context surrounding the sharing of content. More specifically, the content masking device 220 analyzes contextual data (e.g., the identification of an individual with whom the content is shared, time, location, etc.) and identifies the private portions of content based on an analysis of the displayed content (e.g., natural language classification, image classification, etc.) and the surrounding contextual data. Further, in embodiments, the content masking device 220 accesses correlation rules from the contextual data to private content correlation repository 430 to identify private content based on the contextual data. In embodiments, the content masking device 220 implements privacy filters, rules, and criteria that are used to identify private content. In embodiments, the content masking device 220 identifies the non-private portion of the content as the remaining portion of the content that does not include the private portion.

Process 500 further includes generating instructions to mask the private portions (step 520). For example, the content masking device 220 generates instructions to mask the private portions of content such that only the non-private portions of content are displayed on the user device 210. In embodiments, process step 530 includes a series of sub-steps as described herein (e.g., steps 530-570, described below).

Process 500 also includes determining masked and exposed regions corresponding to the private and non-private portions (step 530). For example, as described above with respect to the masking and exposed region determination monitoring module 440, the content masking device 220 determines masking regions on the display of the user device 210 that contain private portions of content (e.g., as identified at step 510). In embodiments, the content masking device 220 identifies virtual coordinates corresponding to the regions of the display of the user device 210 that display the private content. In embodiments, the content masking device 220 identifies that the remaining regions are regions to remain exposed.

Process 500 further includes generating layers associated with the masked and exposed regions (step 540). For example, as described above with respect to the layer generation module 450, the content masking device 220 generates layers corresponding to the masking region and exposed regions determined at step 530. For example, in embodiments, the content masking device 220 stores one set of virtual coordinates associated with the masking region, and another set of virtual coordinates associated with the exposed region. The content masking device 220 forms respective layers (e.g., masking layers and exposed layers) from the corresponding sets of virtual coordinates.

Process 500 also includes manipulating/grouping layers associated with the masked portion to create a masked area (step 550). For example, as described above with respect to the layer manipulation module 460, the content masking device 220 shifts/manipulates the layers such that the masking layers are grouped adjacent to each other, forming a masked area (e.g., similar to masked are 202 shown in FIG. 2A).

Process 500 further includes manipulating/grouping layers associated with the exposed portions to create an exposed area (step 560). For example, as described above with respect to the layer manipulation module 460, the content masking device 220 shifts/manipulates the layers such that the exposed layers are grouped adjacent to each other to form an un-masked area (e.g., similar to un-masked area 204 shown in FIG. 2A). In this way, the non-private content is viewed in a more continuous region without breaks.

Process 500 also includes determining alternate content to present in (step 570). For example, the content masking device 220 determines alternate content to present in the masked area based on user preferences and/or other criteria. As an example, the content masking device 220 determines a targeted advertisement to present based on the interests and/or user profile of a user with whom the content is shared. Additionally, or alternatively, the content masking device 220 determines that the alternate content is a background, solid color, pattern, photo, or the like based on user preferences and/or if the user has an ad-free subscription to use a privacy content masking service.

Process 500 further includes outputting instructions for modifying the displayed content to mask the private portions (step 580). For example, as described above with respect to the layer manipulation module 460, the content masking device 220 outputs instructions to the user device 210 that cause the user device 210 to mask the private portions of content consistent with the manipulation and arrangement of the layers as described herein (e.g., at steps 550 and 560). In this way, the user device 210 displays a masked area (e.g., similar to the masked area 202 as shown in FIG. 2A) and an un-masked area (e.g., similar to the un-masked area 204 shown in FIG. 2A). Further, the masked area includes the alternate content determined at step 570. As described herein, the displayed content can be shared in-person, or screenshotted and shared remotely.

While process 500 is described as being performed by the content masking device 220 as a cloud service, in practice, process 500 may be performed internally by the user device 210 (e.g., through a program module 42 that performs the process steps of process 500). In embodiments in which the user device 210 performs process 500, step 580 is modified to execute (rather than output) the instructions (e.g., generated at step 520-570).

In embodiments, aspects of the present invention provide a system for showing selective content to a user from a display device including identifying a text message to be shown to an individual other than the owner of a device; classifying what content in the text message may be private based on past history, the individual with whom the text is shared (e.g., as identified via facial recognition, user input, voice identification, etc.); receiving user input on which portions of the text message are to be shared and which portions of the text message are to be private; and augmenting the screen of the device to display only the shared portion of the text message. Aspects of the present invention display a recommendation to the user of which portions of content to share and which portions of content to remain private. Aspects of the present invention further identify how much space is remaining on the device screen after only displaying the shared portion of text. Aspects of the present invention determine possible advertisements for the shared person; and display the advertisement in the remaining space. In embodiments, aspects of the present invention determine an intent of the user to share content of a text message based on audio received from the user of the device and the individual with whom to share the content. In embodiments, the intent of the user is used to determine which messages are to remain private and which messages are to be exposed for sharing.

In an example embodiment, aspects of the present invention automatically identify (e.g., based on contextual analysis) private text messages and non-private text messages, of multiple text messages, displayed on a user device 210. Further, aspects of the present invention present, via the user device 210, suggestions to mask the identified private text messages. Further, a user may use, confirm, or modify the suggestions and provide user input identifying/selecting which messages to mask and which to keep unmasked. Aspects of the present invention generate and output instructions to modify the display of the content on the user device 210 to mask those messages that the user has selected to be masked/private, group the masked messaged together, and group and the unmasked messages together.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, by a computing device, private portions and non-private portions of content displayed on a user device;
generating, by the computing device, instructions to modify the display of the content on the user device to mask the private portions of the content, group the private portions of the content together, and group and the non-private portions of the content together; and
outputting, by the computing device, the instructions to cause the user device to modify the display of the content on the user device such that the masked private portions of the content are grouped together and the non-private portions of the content are grouped together, wherein the non-private portions are exposed and visible.

2. The computer-implemented method of claim 1, wherein the generating the instruction to modify the display of the content comprises:
determining a masked region corresponding to the private portions of content;
determining an exposed region corresponding to the non-private portions of content;
generating layers associated with the masked regions;
generating layers associated with the exposed regions;
manipulating the layers associated with the masked regions to group the masked regions together and create a masked area; and
manipulating the layers associated with the exposed regions to group the exposed regions together.

3. The computer-implemented method of claim 2, wherein the generating the instruction to modify the display of the content further comprises determining alternate content to present in the masked area, wherein the outputting the instructions to cause the user device to modify the display of the content comprises presenting the alternate content in the masked area.

4. The computer-implemented method of claim 3, wherein the alternate content comprises a targeted advertisement.

5. The computer-implemented method of claim 2, wherein the determining the masked region and the exposed region includes determining a first set of virtual coordinates corresponding to the masked region and a second set of virtual coordinates corresponding to the exposed region.

6. The computer-implemented method of claim 1, further comprising saving a screenshot of the user device display after the user device modifies the display of the content to mask the private portions.

7. The computer-implemented method of claim 1, wherein the identifying the private portions and the non-private portions comprises receiving user input, that identifies the private portions and the non-private portions.

8. The computer-implemented method of claim 1, wherein the identifying the private portions and the non-private portions comprises:
determining contextual information associated with the content displayed on the user device; and
automatically identifying, without user interaction, the private and non-private portions based on an analysis of the contextual information.

9. The computer-implemented method of claim 8, wherein the contextual information includes at least one selected from the group consisting of:
natural language classification of text of the content; and
image classification of the content.

10. The computer-implemented method of claim 1, wherein a service provider performs at least one selected from the group consisting of: creates the computing device, maintains the computing device, deploys the computing device, and supports the computing device.

11. The computer-implemented method of claim 1, wherein steps of claim 1 are provided by a service provider on a subscription, advertising, and/or fee basis.

12. The computer-implemented method of claim 1, wherein the identifying the private portions of the content comprises receiving manual input by the user, via the user interface of the user device, selecting of one or more individual text messages to mask.

13. The computer-implemented method of claim 1, wherein the identifying the private portions comprises receiving manual input by the user, via the user interface of the user device, the manual input being a boundary drawn around and defining the private portions of the content.

14. A computer program product comprising a computer readable storage medium having program instructions embodied therewith, the program instructions executable by a user device to cause the user device to:
identify private portions and non-private portions of content displayed on the user device;
generate instructions to modify the display of the content on the user device to mask the private portions of the content, group the private portions of the content together, and group and the non-private portions of the content together; and
execute the instructions to cause the user device to modify the display of the content on the user device such that the masked private portions of the content are grouped together and the non-private portions of the content are grouped together, wherein the non-private portions are exposed and visible,
wherein the identifying the private portions comprises receiving manual input by the user, via the user interface of the user device, the manual input being a boundary drawn around and defining the private portions of the content.

15. The computer program product of claim 14, wherein generating the instruction to modify the display of the content further cause the user device to:
determine a masked region corresponding to the private portions of content;
determine an exposed region corresponding to the non-private portions of content;
generate layers associated with the masked regions;
generate layers associated with the exposed regions;
manipulate the layers associated with the masked regions to group the masked regions together and create a masked area; and manipulate the layers associated with the exposed regions to group the exposed regions together.

16. The computer program product of claim 14, wherein the program instructions further cause the user device to save a screenshot of the user device display after the user device modifies the display of the content to mask the private portions.

17. The computer program product of claim 14, wherein the identifying the private portions and the non-private portions comprises:
   determining contextual information associated with the content displayed on the user device; and
   automatically identifying, without user interaction, the private and non-private portions based on an analysis of the contextual information.

18. A system comprising:
   a processor, a computer readable memory and a computer readable storage medium associated with a computing device;
   program instructions to automatically identify private text messages and non-private text messages, of a plurality of text messages, displayed on a user device, wherein the automatically identifying the private text messages and non-private text messages is based on a contextual analysis of contextual information associated with the plurality of text messages;
   program instructions to present via the user device suggestions to mask the identified private text messages;
   program instructions to receive user input identifying a first subset of the plurality of text messages to mask and a second subset of the plurality of text messages to remain unmasked;
   program instructions to generate instructions to modify the display of the plurality of text messages on the user device to mask the first subset of the plurality of text messages, group the masked first subset of the plurality of text messages together, and group and the unmasked second subset of the plurality of text messages together; and
   output the instructions to cause the user device to modify the display of the content on the user device such that the masked first subset of the plurality of text messages are grouped together and the unmasked second subset of the plurality of text messages are grouped together,
   wherein the program instructions are stored on the computer readable storage medium for execution by the processor via the computer readable memory.

19. The system of claim 18, further comprising program instructions to cause the user device to present an advertisement in a space corresponding to the masked first subset of the plurality of text messages.

* * * * *